United States Patent
Kato

(10) Patent No.: US 8,670,136 B2
(45) Date of Patent: Mar. 11, 2014

(54) IMAGE FORMING APPARATUS WITH SPECIALIZED INITIALIZATION INCLUDING AN ENGINE, A CONTROLLER AND IMAGE GENERATION UNIT FOR DRIVING AN IMAGE FORMING ELEMENT

(75) Inventor: Hiroshi Kato, Tokyo (JP)

(73) Assignee: Oki Data Corporation, Tokyo (JP)

( * ) Notice: Subject to any disclaimer, the term of this patent is extended or adjusted under 35 U.S.C. 154(b) by 284 days.

(21) Appl. No.: 12/709,596

(22) Filed: Feb. 22, 2010

(65) Prior Publication Data

US 2010/0214606 A1    Aug. 26, 2010

(30) Foreign Application Priority Data

Feb. 26, 2009  (JP) .................................. 2009-043994

(51) Int. Cl.
*G06K 15/00*  (2006.01)

(52) U.S. Cl.
USPC .......................... 358/1.14; 358/1.15; 358/409

(58) Field of Classification Search
USPC ................................................. 358/1.1–3.23
See application file for complete search history.

(56) References Cited

U.S. PATENT DOCUMENTS

| | | | |
|---|---|---|---|
| 5,815,187 A * | 9/1998 | Ross, Jr. | 347/131 |
| 6,731,403 B1 * | 5/2004 | Ohnishi | 358/1.9 |
| 2003/0095037 A1 * | 5/2003 | Ueno | 340/310.01 |
| 2010/0157369 A1 * | 6/2010 | Kurita | 358/1.15 |

FOREIGN PATENT DOCUMENTS

| | | | | |
|---|---|---|---|---|
| JP | 06-171794 A | | 6/1994 | |
| JP | 02004074655 A | * | 3/2004 | ............... B41J 29/38 |
| JP | 2004-333913 A | | 11/2004 | |

* cited by examiner

*Primary Examiner* — Benny Q Tieu
*Assistant Examiner* — Marcellus Augustin
(74) *Attorney, Agent, or Firm* — Marvin A. Motsenbocker; Mots Law, PLLC

(57) ABSTRACT

An image forming apparatus includes: a controller and an engine. The controller includes a first memory configured to store therein first setting information for driving the image forming element. The engine includes: an image generation unit configured to drive the image forming element; a second memory configured to store therein second setting information for driving the image forming element; and an initialization processor configured to initialize the image generation unit based on the second setting information before a communication between the controller and the engine is established, to compare the first setting information with the second setting information after the communication between the controller and the engine is established, and to execute an initialization of the image generation unit based on the first setting information when the first setting information does not correspond to the second setting information.

10 Claims, 6 Drawing Sheets

— PRIOR ART —

IMAGE FORMING APPARATUS WITH SPECIALIZED INITIALIZATION INCLUDING AN ENGINE, A CONTROLLER AND IMAGE GENERATION UNIT FOR DRIVING AN IMAGE FORMING ELEMENT

CROSS REFERENCE TO RELATED APPLICATIONS

This application claims priority based on 35 USC 119 from prior Japanese Patent Application No. 2009-043994 filed on Feb. 26, 2009, entitled "Image Forming Apparatus", the entire contents of which are incorporated herein by reference.

BACKGROUND OF THE INVENTION

1. Field of the Invention

The invention relates to an image forming apparatus.

2. Description of Related Art

Conventional image forming apparatus such as a printer, a copy machine, a multi-function peripheral, or the like, typically include a printer, the printer including a controller storing setting for image forming process and, an engine configured to drive an image forming element such as a LED print head, a motor, a clutch, a heater, or the like based on the setting stored in the controller. A high-capacity hard disk is disposed in the controller and stores therein setting information such as LED print head setting information.

Upon turning on the printer, the controller is initialized, and then the engine obtains the print head setting information from the controller and starts to execute an initialization process based on the print head setting information (for example, Japanese Patent Application Laid-Open No. H06-171794).

SUMMARY OF THE INVENTION

However, in the conventional printer, the engine does not receive the print head setting information until the initialization process of the controller is completed. This delays the start of the initialization process of the engine, thereby prolonging the entire initialization process of the printer. In the case, for example, where a hard disk is added to the controller, the initialization process speed of the controller is decreased, the start of the initialization process of the engine is delayed, and the entire initialization process of the printer is prolonged.

The object of the invention is to provide an image forming apparatus having a shortened period of time from the beginning to the end of the entire initialization process of the image forming apparatus.

An aspect of the invention is an image forming apparatus including: a controller configured to store setting for the image-forming process; and an engine configured to drive the image forming element based on the setting of the controller. The controller includes a first memory configured to store therein first setting information for driving the image forming element. The engine includes: an image generation unit to drive the image forming element; a second memory to store therein second setting information for driving the image forming element; and an initialization processor configured to initialize the image generation unit based on the second information before communication between the controller and the engine is established, to compare the first setting information with the second setting information after the communication between the controller and the engine is established, and to perform the initialization of the image generation unit based on the first setting information when the first setting information does not correspond to the second setting information.

According to the aspect of the invention, the image generation unit is initialized based on the second setting information before the communication between the controller and the engine is established. After the communication between the controller and the engine is established, the first setting information and the second setting information are compared with each other. When the first setting information and the second setting information do not correspond to each other, the image generation unit is reinitialized based on the first setting information.

Therefore, when the image forming apparatus is turned on, the initialization of the engine can be started before the communication between the engine and the controller is established.

The engine can obtain the setting information without a delay, and this accelerates the start of the initialization of the engine. Accordingly, the period of the entire initialization process of the image forming apparatus is shortened.

DETAILED DESCRIPTION OF THE EMBODIMENT

Hereinafter, embodiments of the invention will be described in detail with reference to the drawings. The following description will be made for a printer serving as the image forming apparatus.

Figure 2:
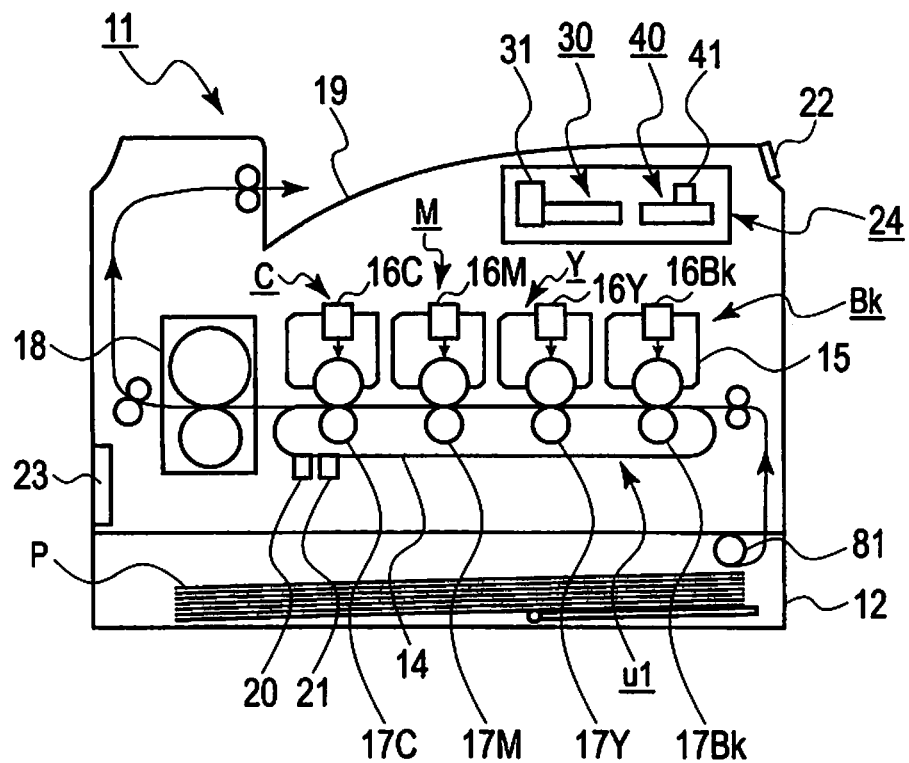
FIG. 2 is a block diagram of a printer according to the first embodiment.

FIG. 2 shows printer 11, paper cassette 12 (media container) containing papers P (media) therein, image forming units Bk, Y, M, and C (image forming parts) configured to form toner images (developer images) of respective colors (black, yellow, magenta, and cyan), image transfer unit U1, and fixing unit 18 (fixing device). Each image forming unit Bk, Y, M, C includes photosensitive drum 15 serving as an image carrier, an un-illustrated charging roller serving as a charging unit, an un-illustrated development roller serving as a developer carrier, and the like. LED heads 16Bk, 16Y, 16M and 16C (serving as recording heads or exposure units) are disposed such that LED heads 16Bk, 16Y, 16M and 16C are opposed to respective photosensitive drums 15.

Further, image transfer unit U1 includes transfer belt 14 configured to convey paper P and image transfer rollers 17Bk, 17Y, 17M and 17C (image transfer members) opposed to respective photosensitive drums 15 in a manner that transfer belt 14 intervenes between image transfer rollers 17Bk, 17Y, 17M and 17C and photosensitive drums 15.

Paper P in paper cassette 12 is fed to a printer body by hopping roller 81 (feed roller) and conveyed by transfer belt 14 through an image transfer section between image transfer unit U1 and image forming units Bk, Y, M, and C.

In each image forming unit Bk, Y, M, C, the surface of photosensitive drum 15 is uniformly charged by the charging roller, and exposed by LED print head 16Bk, 16Y, 16M, 16C so that an electrostatic latent image (latent image) is formed on the surface of photosensitive drum 15. The development roller develops the electrostatic latent image to form a toner image on the photosensitive drum 15 by supplying toner to the electrostatic latent image. Transfer rollers 17Bk, 17Y, 17M and 17C transfer the respective toner images of image forming units Bk, Y, M, and C onto paper P that is conveyed on transfer belt 14, thereby forming a multi-color toner image on paper P.

Next, paper P having the multi-color toner image is conveyed to fixing unit 18. Fixing unit 18 heats and presses the multi-color toner image on the paper P to fix it to paper P so that a multi-color image is printed on paper P. The printed paper P is discharged out of the printer body and stacked on paper stacker 19 (media stacking unit).

Note that color deviation sensor 20 (serving as a first detector or a color deviation detector) and density sensor 21 (serving as a second detector or a density detector) are disposed facing transfer belt 14. Color deviation sensor 20 detects a color-deviation correction-amount detection pattern (a first pattern) formed on paper P for a color-deviation correction process. Density sensor 21 detects a density correction-amount detection pattern (a second pattern) formed on paper P for a density correction process.

Operator panel 22 serves as a display to display printer states and serves as an operator interface to input setting information of printer 11. LAN interface 23 serves as an external interface configured to transmit and receive data such as print data to and from an un-illustrated host computer serving as an external device. The setting information is information used by engine 40 for driving the image forming elements such as LED print heads 16Bk, 16Y, 16M and 16C, a motor, a clutch, and a heater.

Control device 24 controls the entire printer 11. Control device 24 includes controller 30 which stores setting for the image-forming process and engine 40 which drives the image forming elements such as LED print heads 16Bk, 16Y, 16M and 16C, the motors, the clutches, and the heater based on the setting stored in controller 30. Controller 30 includes high-capacity hard disk 31 serving as a first memory, and engine 40 includes flash memory 41 (nonvolatile memory) serving as a second memory.

Figure 3:
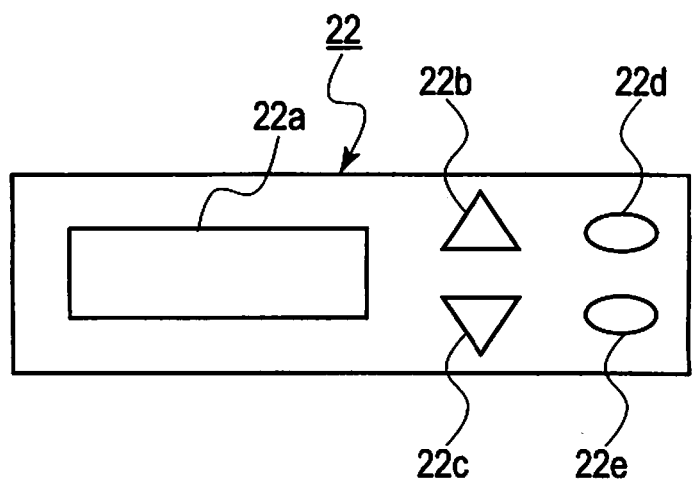
FIG. 3 is a detail view of an operator panel according to the first embodiment.

FIG. 3 shows a detailed view of the operator panel of the first embodiment.

As shown in FIG. 3, operator panel 22 includes LCD panel 22a serving as a display element and switches 22b to 22e serving as operating elements. The printer states are listed on LCD panel 22a when the operator pushes switches 22b or 22c. Setting information for printer 11 is selected when the operator further pushes switches 22d or 22c, and the setting information is stored when the operator pushes switch 22d.

Next, controller 30 and engine 40 will be described.

Figure 1:
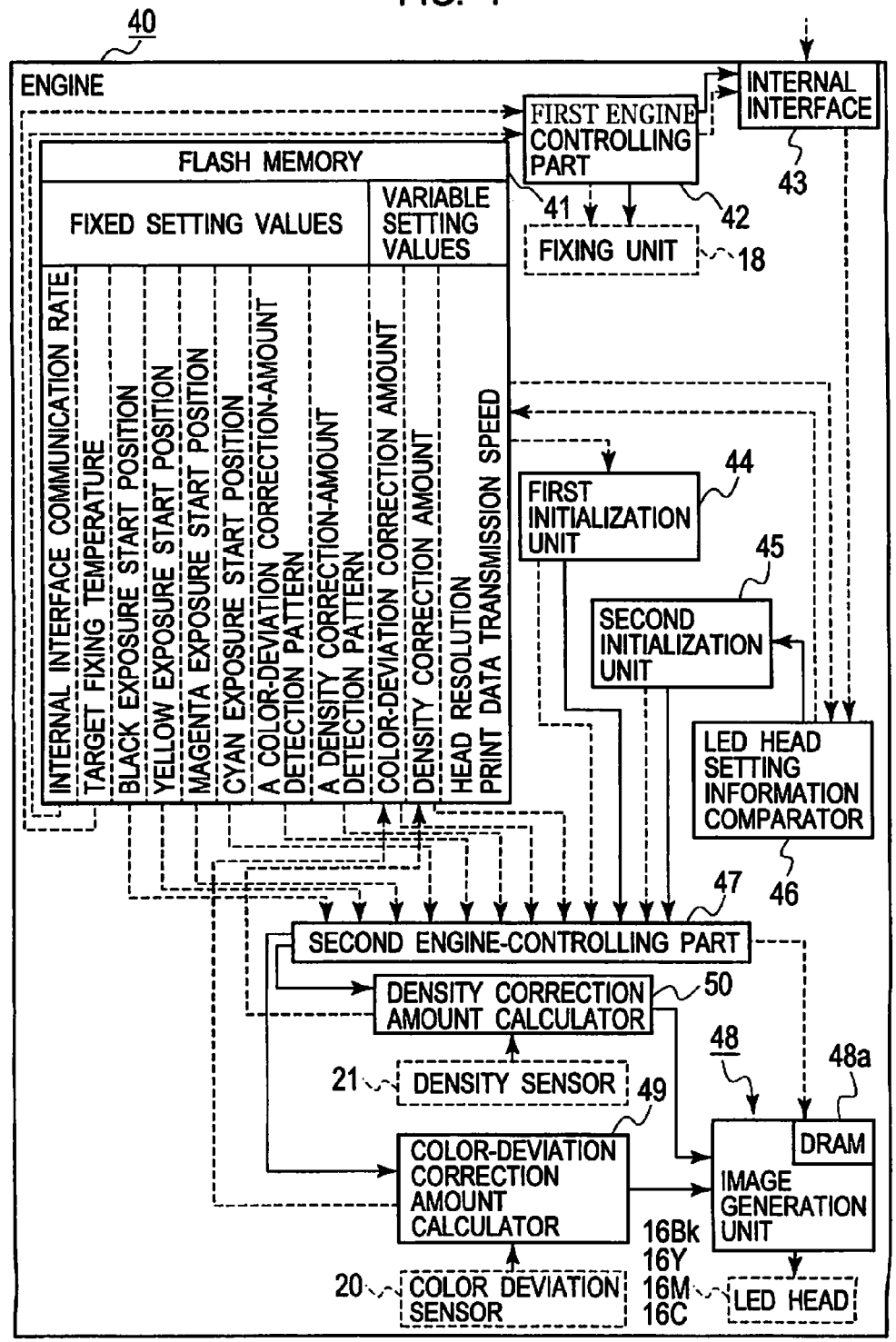
FIG. 1 is a control block diagram of an engine according to a first embodiment of the invention.
Figure 4:
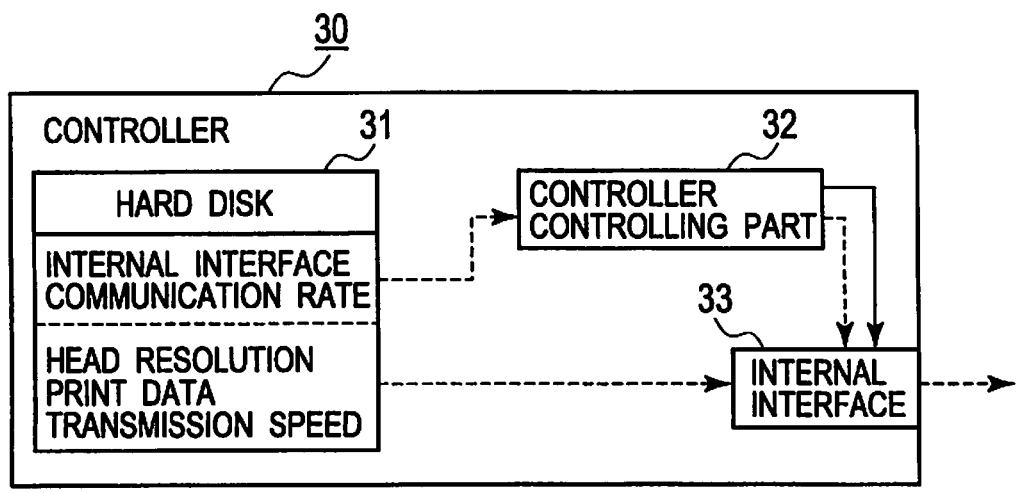
FIG. 4 is a control block diagram of a controller according to the first embodiment.

FIG. 1 is a control block diagram of engine 40 of the first embodiment, and FIG. 4 is a control block diagram of controller 30 of the first embodiment.

Referring to FIGS. 1 and 4, controller 30 includes hard disk 31, controller-controlling part 32, and internal interface 33. Engine 40 includes flash memory 41, first and second engine-controlling parts 42 and 47, internal interface 43, first and second initialization units 44 and 45, print head setting information comparator 46, image generation unit 48, color-deviation correction amount calculator 49 serving as a first correction amount calculator, and density correction amount calculator 50 serving as a second correction amount calculator. A cable connects internal interface 33 of controller 30 and internal interface 43 of engine 40 so that controller 30 and engine 40 can communicate with each other. Image generation unit 48 includes DRAM 48a serving as a third memory.

Note that an initialization processor comprises first and second engine-controlling parts 42 and 47, first and second initialization units 44 and 45, image generation unit 48, color-deviation correction amount calculator 49, and density correction amount calculator 50.

Hard disk 31 stores therein the setting information (setting values) such as the internal interface communication rate, which is the transmission speed of internal interface 33, LED print head resolution, which is the resolution of LED print heads 16Bk, 16Y, 16M, and 16C, a print data transmission speed, which is the transmission speed of the print data, and like. Note that the LED print head resolution and the print data transmission speed, which serve as first print head setting information (first setting information), are preset as inherent information of printer 11 and stored in hard disk 31.

Flash memory 41 stores therein fixed setting values serving as first setting values and variable setting values serving as second setting values. The fixed setting values include setting information about an internal interface communication rate, which is the transmission speed of internal interface 43, a target fixing temperature, which is the target value of the fixing temperature of fixing unit 18, a black exposure start position, which is the timing for when LED print head Bk emits light onto photosensitive drum 15, a yellow exposure start position, which is the timing for when LED print head Y emits light onto photosensitive drum 15, a magenta exposure start position, which is the timing for when LED print head M emits light onto photosensitive drum 15, a cyan exposure start position, which is the timing for when LED print head C emits light onto photosensitive drum 15, a color-deviation correction-amount detection pattern, and a density correction-amount detection pattern. The variable setting values include setting information about a color-deviation amount serving as a first correction amount, a density correction amount serving as a second correction amount, the LED print head resolution, and the print data transmission speed. Note that the LED print head resolution and the print data transmission speed of the variable processing values, which serve as second print head setting information (second setting information), are set when the printer executes the previous printing and are stored in flash memory 41. The default values of the LED print head resolution and the print data transmission speed are preset as inherent information of printer 11 and stored in flash memory 41.

Next, operation of printer 11 having the above configuration will be described.

Figure 5:
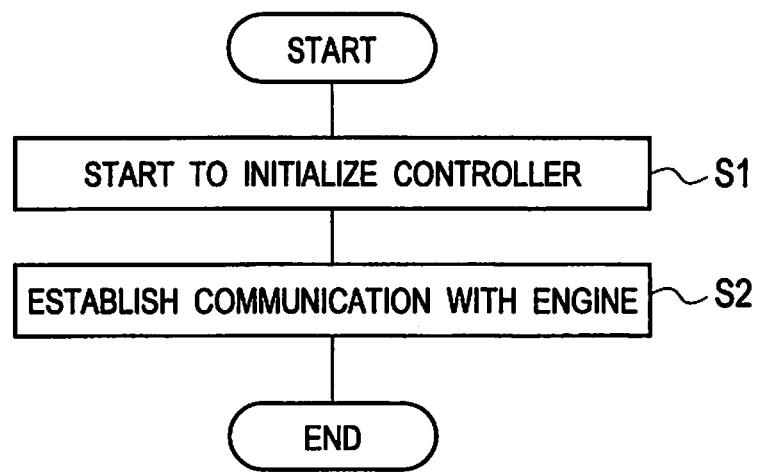
FIG. 5 is a flow chart of the operation of the controller according to the first embodiment.
Figure 6:
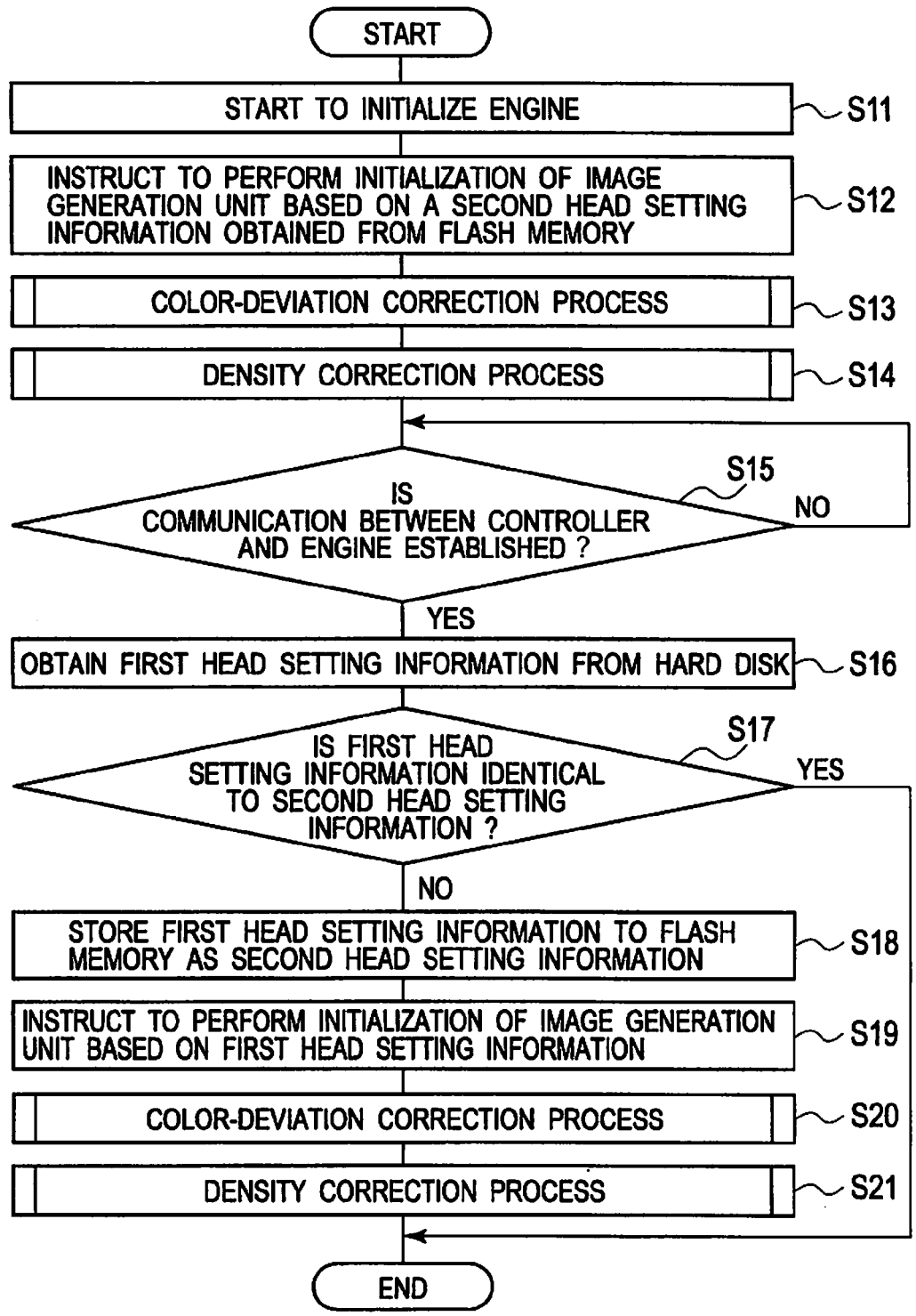
FIG. 6 is a flow chart of the operation of the engine according to the first embodiment.
Figure 7:
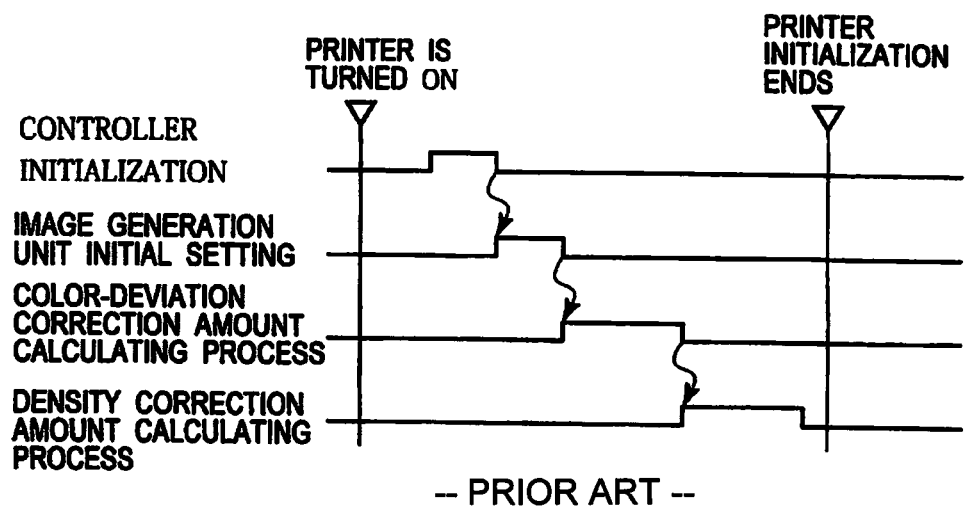
FIG. 7 is a time chart showing the operation of a control device of a conventional printer.
Figure 8:
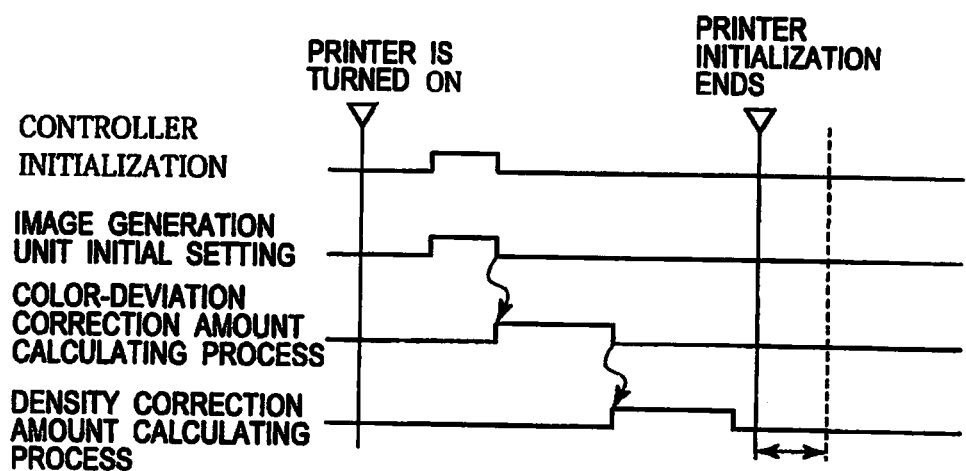
FIG. 8 is a time chart showing the operation of a control device of the first embodiment.

FIG. 5 is a flow chart of the operation of the controller of the first embodiment. FIG. 6 is a flow chart of the operation of the engine of the first embodiment. FIG. 7 is a time chart showing operation of a control device of a conventional printer. FIG. 8 is a time chart showing operation of the control device of the first embodiment.

First, when the operator turns on printer 11, controller-controlling part 32 in controller 30 starts to initialize controller 30. That is, controller-controlling part 32 reads out and obtains the internal interface transmission speed from hard disk 31 when the hard disk becomes accessible, and initializes the internal interface 33.

Further, when printer 11 is turned on, first engine-controlling part 42 in engine 40 starts to initialize engine 40 while controller 30 is initialized. First engine-controlling part 42 obtains the internal interface transmission speed from flash memory 41 and initializes the internal interface 43. Engine-controlling part 42 also obtains the target fixing temperature from flash memory 41 while obtaining the internal interface transmission speed from flash memory 41, initializes fixing unit 19, and then starts to control fixing unit 19.

Upon the start of the initialization of engine 40, first initialization unit 44 obtains the LED print head resolution and the print data transmission speed, which serve as the second print head setting information, that were stored at the previous printing, and then instructs second initialization unit 45 to perform an initialization of image generation unit 48 based on the second print head setting information. Second initialization unit 45 performs the initialization of image generation unit 48 by storing to DRAM 48*a* of image generation unit 48 the second print head setting information that is transmitted from the first initialization unit 44 to the second initialization unit 45.

Next, second engine-controlling part 47 obtains the color-deviation correction-amount detection pattern from flash memory 41, transmits it to color-deviation correction amount calculator 49, and instructs color-deviation amount calculator 49 to calculate a color-deviation correction amount. Color-deviation correction amount calculator 49 executes the color-deviation correction process and receives the color-deviation correction-amount detection pattern and transmits it to image generation unit 48. Image generation unit 48 reads the second print head setting information that is stored in DRAM 48*a*, drives image forming elements (LED print heads 16Bk, 16Y, 16M, and 16C in this embodiment) based on the second print head setting information, and forms a color-deviation correction-amount detection pattern on transfer belt 14. When color-deviation sensor 20 detects the color-deviation correction-amount detection pattern, color-deviation correction amount calculator 49 read the detection result, calculates a color-deviation correction amount based on the detection result, and stores the calculated color-deviation correction amount to flash memory 41.

Next, second engine-controlling part 47 obtains the density correction-amount detection pattern from flash memory 41, transmits it to density correction amount calculator 50, and instructs density correction amount calculator 50 to calculate a density correction amount. Density correction amount calculator 50 executes the density correction process and receives the density correction-amount detection pattern and transmits it to image generation unit 48. Image generation unit 48 calculates a density correction amount and stores it to flash memory 41. Specifically, density correction amount calculator 50 reads the second print head setting information that is stored in DRAM 48*a*, drives LED print heads 16Bk, 16Y, 16M, and 16C based on the second print head setting information, and forms a density correction-amount detection pattern on transfer belt 14. When density sensor 21 detects the density correction-amount detection pattern, density correction amount calculator 50 reads the detection result, calculates a density correction amount based on the detection result, and stores the calculated density correction amount to flash memory 41.

In printer 11 having the above configuration, controller 30 is sometimes replaced with a new one. Since the first print head setting information is changed corresponding to controller-controlling part 32, engine 30 is not initialized appropriately if the initialization of engine 30 is, after the replacement of the controller 30, executed based on a first print head setting information that was set before the replacement of controller 30.

To overcome the above problem, this embodiment executes the following process. In engine 40, print head setting information comparator 46 waits until a communication between controller 30 and engine 40 is established, obtains the first print head setting information from hard disk 31 and the second print head setting information from flash memory 41 when the communication is established, compares the first print head setting information with the second print head setting information, and determines whether or not the first print head setting information corresponds to the second print head setting information.

When the first print head setting information corresponds to the second print head setting information, first engine-controlling part 42 terminates the initialization process of engine 40. When the first print head setting information does not correspond to the second print head setting information, print head setting information comparator 46 determines that the first print head setting information is the proper print head setting information and transmits the first print head setting information to second initialization unit 45.

Second initialization unit 45 instructs second engine-controlling part 47 to execute an initial setting of image generation unit 48 based on the first print head setting information. Second engine-controlling part 47 executes the initial setting of image generation unit 48 by storing to DRAM 48*a* the first print head setting information transmitted from second initialization unit 45.

Next, as described above, responding to the instruction from second engine-controlling part 47, color-deviation correction amount calculator 49 forms a density correction-amount detection pattern on the transfer belt 14 based on the first print head setting information, calculates a color-deviation correction amount based on a detection result of the density correction-amount detection pattern, and stores the color-deviation correction amount to flash memory 41.

Next, as described above, responding to the instruction of second engine-controlling part 47, density correction amount calculator 50 forms a density correction-amount detection pattern on transfer belt 14 based on the first print head setting information, calculates a density correction amount based on a detection result of the density correction-amount detection pattern, and stores the density correction amount to flash memory 41.

In this way, the first print head setting information stored in hard disk 31 and the second print head setting information stored in flash memory 41 are compared with each other and then the latest print head setting information is stored in flash memory 41. With this, when the printer is turned on the next time, the initialization of engine 40 can be started before communication between engine 40 and controller 30 is established.

This prevents the delay of obtaining the first and second print head setting information in engine 40, and accelerates the start of the initialization of engine 40. Accordingly, the period of the entire initialization process of printer 11 is reduced.

In the case, for example, where a hard disk is added to controller 30, the initialization process speed of controller 30 is decreased. Even though the initialization process speed of controller 30 is decreased, this embodiment prevents the start of the initialization of engine 40 from delaying and shortens the period of the entire initialization process of printer 11.

Unlike this embodiment, a conventional printer proceeds with an initialization process as shown in FIG. 7. In such a conventional printer, after the initialization of the controller ends, the initialization of the engine starts and executes an initial setting of the image generation unit. After the initial setting of the image generation unit, a color-deviation correction amount calculation process and a density correction amount calculation process are executed. In contrast to such a conventional printer, printer 1 of this embodiment proceeds with the initialization process as shown in FIG. 8. In this embodiment, upon the start of the initialization of controller 30, the initialization of engine 40 is started before a communication between controller 30 and engine 40 is established. After the initial setting of image generation unit 98 is completed, the color-deviation correction amount calculation process and the density correction amount calculation process are executed.

Next, the flow chart in FIG. 5 will be described.

Step S1: Start to initialize controller 30.

Step S2: Establish communication with engine 40, and end the process.

Next, the flow chart in FIG. 6 will be described.

Step S11: Start to initialize engine 40.

Step S12: Instruction to execute an initialization of image generation unit 48 based on the second print head setting information obtained from flash memory 41.

Step S13: Execute a color-deviation correction process.

Step S14: Execute a density correction process

Step S15: Wait until the communication between controller 30 and engine 40 is established, and then proceed to Step S16 if the communication is established, Step S16: Obtain a first print head setting information from hard disk 31.

Step S17: Determine whether the first print head setting information corresponds to the second print head setting information. End the process when the first and second print head setting information correspond to each other. Proceed to Step S18 when the first and second print head setting information are not identical to each other.

Step S18: Store to flash memory 41 the first print head setting information as a new second print head setting information.

Step S19: Instruction to perform an initialization of image generation unit 48 based on the first print head setting information.

Step S20: Execute a color-deviation correction process.

Step S21: Execute a density correction process, and then end the process.

Note that after the initialization of printer 11 described above, printer 11 executes printing based on the print data that is transmitted from the host computer. When printing, second engine-controlling part 47 obtains the black exposure start position, the yellow exposure start position, the magenta exposure start position, and the cyan exposure start position from flash memory 41, and corrects the black exposure start position, the yellow exposure start position, the magenta exposure start position, and the cyan exposure start position based on the color-deviation correction amount to calculate the exposure start positions of the respective colors, and stores them to DRAM 48a of image generation unit 48. Based on the respective color exposure start positions that are stored in DRAM 48a, image generation unit 48 executes a color-deviation correction by shifting (adjusting) the respective timing of driving LED print heads 16Bk, 16Y, 16M, and 16C (respective exposure timings of LED print heads 16Bk, 16Y, 16M, and 16C).

Further, second engine-controlling part 47 obtains the density correction amount from flash memory 41 and stores it to DRAM 48a in image generation unit 48. Image generation unit 48 corrects the density by changing the exposure times of LED print heads 16Bk, 16Y, 16M, and 16C based on the density correction amount stored in DRAM 48a.

Next, a second embodiment of the invention will be described. Note that in the second embodiment, the same configurations as the first embodiment are donated by the same numeral as the first embodiment and the effect caused by the same configuration will be omitted.

Figure 9:
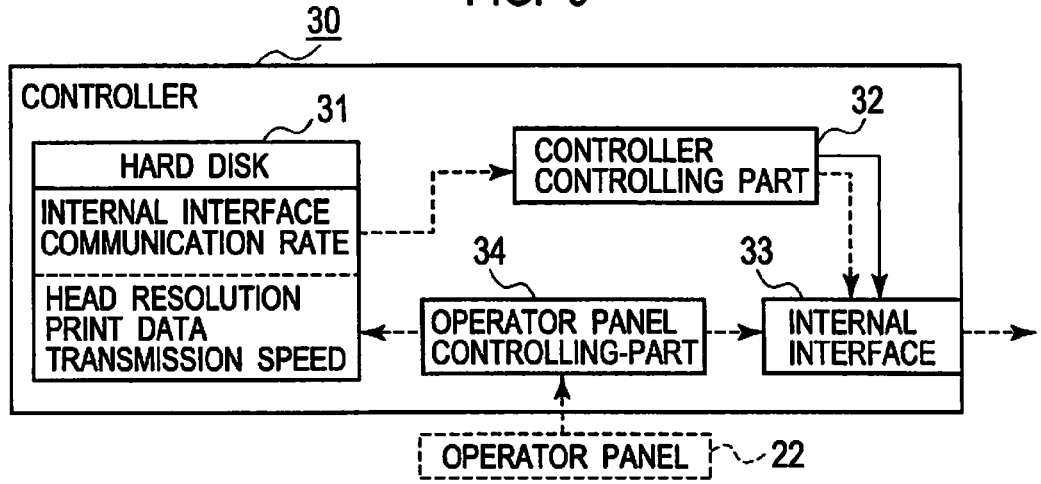
FIG. 9 is a control block diagram of a controller according to a second embodiment of the invention.
Figure 10:
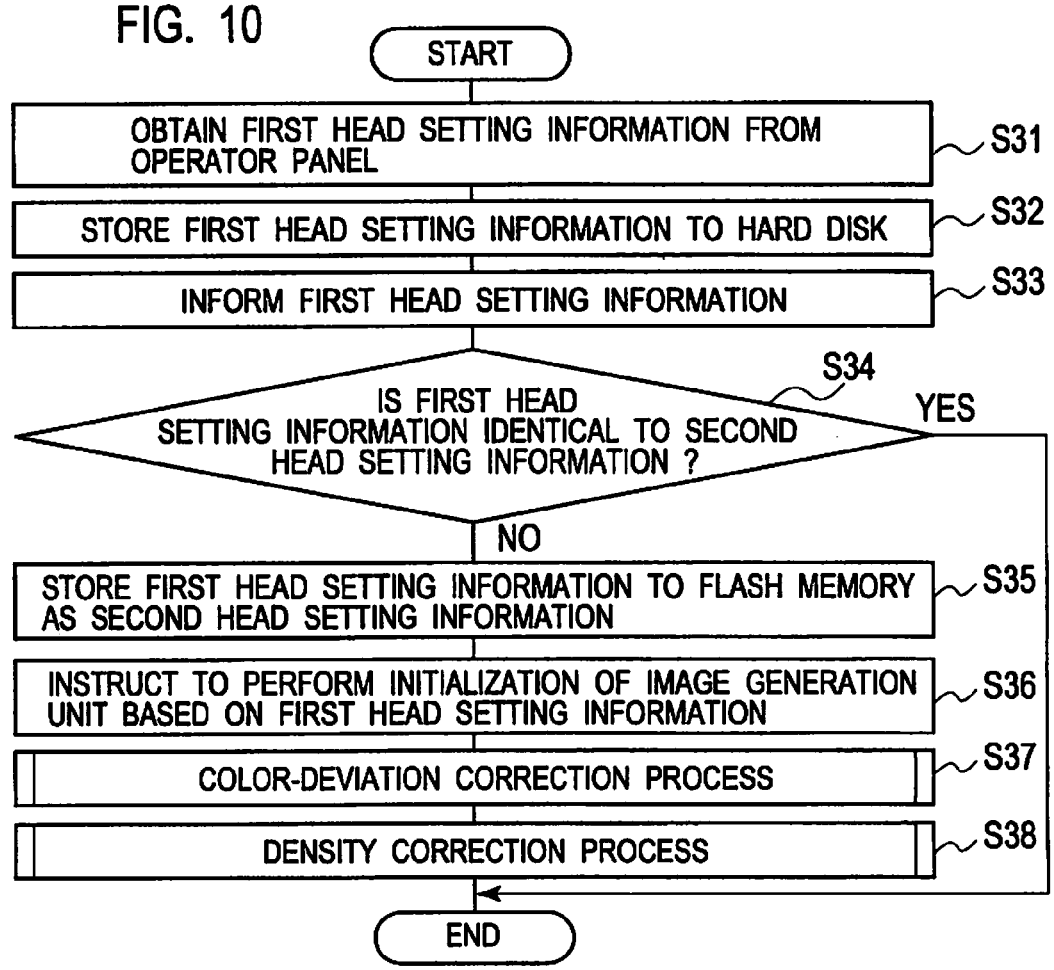
FIG. 10 is a flow chart of the operation of an engine according to the second embodiment.

FIG. 9 is a control block diagram of a controller according to the second embodiment. FIG. 10 is a flow chart of the operation of the engine according to the second embodiment.

In this embodiment, operator panel controlling-part 34 is provided in controller 30 and operator panel controlling-part 34 is connected to operator panel 22, which serves as a display and an operator interface.

The user operates operator panel 22 to set setting information (print head resolution and print data transmission speed in this embodiment). Operator panel controlling-part 34 obtains LED print head resolution and print data transmission speed, which serve as first print head setting information, from operator panel 22, stores them to hard disk 31 serving as a first memory, and transmits them to print head setting information comparator 46. Note that the operator can select desired setting information by pushing switches 22b, 22c of operator panel 22 (see FIG. 3), and stores the selected information by pushing switch 22d of operator panel 22 (see FIG. 3).

Print head setting information comparator 46 obtains the first print head setting information received from operator panel controlling-part 34 and the second print head setting information from flash memory 41 serving as a second memory, compares the first print head setting information and the second print head setting information, and determines whether the first print head setting information and the second print head setting information correspond to each other.

When the first print head setting information and the second print head setting information correspond to each other, first engine-controlling part 42 terminates the initialization of engine 40. When the first print head setting information and the second print head setting information do not correspond to each other, print head setting information comparator 46 determines that the first print head setting information is appropriate setting information and transmits the first print head setting information to second initialization unit 45.

Second initialization unit 45 instructs second engine-controlling part 47 to perform an initial setting of image generation unit 48 based on the first print head setting information. Second engine-controlling part 47 executes the initial setting of image generation unit 48 by storing to DRAM 48a, serving as a third memory, the first print head setting information transmitted from second initialization unit 45.

Next, as described above, responding to the instruction from second engine-controlling part 47, color-deviation correction amount calculator 49, serving as a first correction amount calculator, forms a density correction-amount detection pattern on transfer belt 14 based on the first print head setting information, calculates a color-deviation correction amount, serving as a first correction amount, based on the detection result of the density correction-amount detection pattern, and stores the color-deviation correction amount to flash memory 41.

Next, as described above, responding to the instruction from second engine-controlling part 47, density correction amount calculator 50 serving as a second correction amount calculator forms a density correction-amount detection pattern on transfer belt 14 based on the first print head setting information, and calculates a density correction amount serving as a second correction amount based on the detection result of the density correction-amount detection pattern, and stores the density correction amount to flash memory 41.

In the case, for example, where controller 30 is replaced with a new one and the print head setting information is thus presumed to be changed when the printer is turned on the next time, the user can previously store first setting information via operator panel 22. Therefore the initialization of engine 40 can be started, before communication between controller 30 and engine 40 is established after turning on printer 11.

This prevents a delay in obtaining the first and second print head setting information in engine 40, and accelerates the start of the initialization of engine 40. Accordingly, the period of the entire initialization process of printer 11 is shortened.

Next, the flow chart in FIG. 10 will be described.

Step S31: Obtain first print head setting information from operator panel 22.

Step S32: Store the first print head setting information to hard disk 31.

Step S33: Inform the first print head setting information.

Step S34: Determine whether the first print head setting information and the second print head setting information correspond to each other. Terminate the process and proceed to step S35 when the first print head setting information and second print head setting information do not correspond to each other.

Step S35: Store to flash memory 41 the first print head setting information as a new second print head setting information.

Step S36: Instruction to execute an initial setting of image generation unit 48 based on the first print head setting information.

Step S37: Execute a color-deviation correction amount calculation process.

Step S38: Execute a density correction amount calculation process, and terminate the process.

Note that although the above embodiments describes a printer serving as a image forming apparatus, the invention can be applied to a copy machine, a facsimile machine, a multi-function printer, or the like.

The invention includes other embodiments in addition to the above-described embodiments without departing from the spirit of the invention. The embodiments are to be considered in all respects as illustrative, and not restrictive. The scope of the invention is indicated by the appended claims rather than by the foregoing description. Hence, all configurations including the meaning and range within equivalent arrangements of the claims are intended to be embraced in the invention.

What is claimed is:

1. An image forming apparatus comprising:
    a controller configured to store a setting for an image forming process of the image forming apparatus, wherein the controller includes a first memory configured to store therein first setting information for driving a image forming element; and
    an engine configured to drive the image forming element based on the setting stored in the controller, wherein the engine includes:
        an image generation unit configured to drive the image forming element;
        a second memory configured to store therein second setting information for driving the image forming element; and
        a power-on initialization processor configured to initialize the image generation unit based on the second setting information before a communication between the controller and the engine is established, to compare the first setting information with the second setting information after the communication between the controller and the engine is established, and to execute a re-initialization of the image generation unit based on the first setting information when the first setting information does not correspond to the second setting information,
    wherein the power-on initialization processor is configured to update the second setting information stored in the second memory by replacing the second setting information with the first setting information, after determining that the first setting information does not correspond to the second setting information.

2. The image forming apparatus according to claim 1, wherein
    the first setting information is stored in the first memory prior to shipment of the image forming apparatus.

3. The image forming apparatus according to claim 1, further comprising
    an operator interface with which an operator can store the first setting information.

4. The image forming apparatus according to claim 1, wherein
    the engine includes a correction amount calculator configured to calculate, based on either the first setting information or the second setting information, a correction amount for image-forming.

5. The image forming apparatus according to claim 1, wherein the initialization is a density correction process or a color-deviation correction process.

6. The image forming apparatus according to claim 1, wherein
    when the image forming apparatus is turned on, the power-on initialization processor and the controller are configured to perform respective power-on initializations in parallel.

7. An method of initializing an image forming apparatus, comprising the steps of:
    initializing a controller configured to store a setting for an image forming process of the image forming apparatus;
    initializing an engine based on second setting information stored in the engine, before a communication between the controller and the engine is established, the engine configured to drive an image forming element;
    obtaining, by the engine, first setting information from the controller after the communication between the controller and the engine is established;
    comparing the first setting information with the second setting information; and
    re-initializing the engine based on the first setting information, when the first setting information does not correspond to the second setting information,
    wherein the re-initializing comprises updating the second setting information by replacing the second setting information with the first setting information, after determining that the first setting information does not correspond to the second setting information.

8. The method of initializing the image forming apparatus according to claim 7, wherein the initialization of the engine is either a density correction process or a color-deviation correction process.

9. The method of initializing the image forming apparatus according to claim 7, wherein
the initialization of the controller and the initialization of the engine are executed simultaneously.

10. The method of initializing the image forming apparatus according to claim 7, wherein
when power is turned on, the initialization of the controller and the initialization of the engine are executed in parallel.

* * * * *